(12) United States Patent
Boulet et al.

(10) Patent No.: US 12,504,572 B2
(45) Date of Patent: Dec. 23, 2025

(54) OPTICAL DEVICE WITH HOLOGRAPHIC LAYER

(71) Applicant: IDEMIA FRANCE, Courbevoie (FR)

(72) Inventors: Romain Boulet, Courbevoie (FR); Leon Segeren, Courbevoie (FR); Paul Azuelos, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 472 days.

(21) Appl. No.: 18/065,190

(22) Filed: Dec. 13, 2022

(65) Prior Publication Data

US 2023/0185089 A1 Jun. 15, 2023

(30) Foreign Application Priority Data

Dec. 13, 2021 (FR) ..................................... 21 13404

(51) Int. Cl.
| | |
|---|---|
| *G02B 5/32* | (2006.01) |
| *B42D 25/324* | (2014.01) |
| *B42D 25/328* | (2014.01) |
| *B42D 25/346* | (2014.01) |
| *B42D 25/425* | (2014.01) |
| *B42D 25/435* | (2014.01) |
| *B42D 25/46* | (2014.01) |

(52) U.S. Cl.
CPC ............. *G02B 5/32* (2013.01); *B42D 25/324* (2014.10); *B42D 25/328* (2014.10); *B42D 25/346* (2014.10); *B42D 25/425* (2014.10); *B42D 25/435* (2014.10); *B42D 25/46* (2014.10)

(58) Field of Classification Search
CPC ........................................................ G02B 5/32
See application file for complete search history.

(56) References Cited

U.S. PATENT DOCUMENTS

| | | | |
|---|---|---|---|
| 2012/0194884 A1* | 8/2012 | Shinoda | ................... G02B 5/32 355/2 |
| 2015/0367669 A1 | 12/2015 | Ruhland-Bauer et al. | |
| 2023/0021631 A1* | 1/2023 | Nishizawa | ............... B32B 7/12 |

FOREIGN PATENT DOCUMENTS

DE   10 2013 000 556 A1   7/2014

OTHER PUBLICATIONS

French Preliminary Search Report issued Jul. 13, 2022 in French Application 21 13404, filed on Dec. 13, 2021 (with English Translation and Written Opinion), 22 pages.
(Continued)

*Primary Examiner* — Paisley L Wilson
(74) *Attorney, Agent, or Firm* — Oblon, McClelland, Maier & Neustadt, L.L.P.

(57) ABSTRACT

An optical device and to a corresponding manufacturing process, the device including a textured layer including, on its surface, first macro-textures; and a carrier including, on its surface, a holographic layer intermediate between the textured layer and the carrier. The holographic layer includes a diffraction grating forming, via a holographic effect, an arrangement of pixels in a basis of at least two distinct colours. The textured layer is assembled by lamination with the carrier so that the holographic layer, placed between the textured layer and the carrier, is deformed by the first macro-textures so as to include second macro-textures conformal with the first macro-textures, the visual appearance of the arrangement of pixels being personalized via the second macro-textures.

14 Claims, 8 Drawing Sheets

(56) References Cited

OTHER PUBLICATIONS

Van Renesse, R. "Diffractive Pixels", Optical Document Security, 2005, Artech House, pp. 191-205 (17 pages).

* cited by examiner

[Fig. 1]
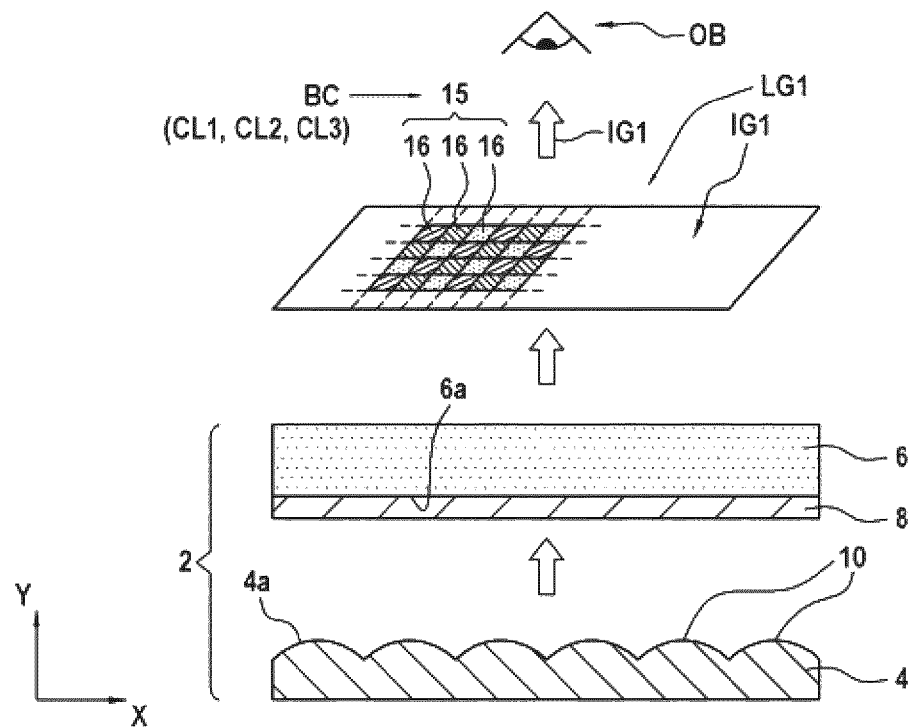
[Fig. 2]
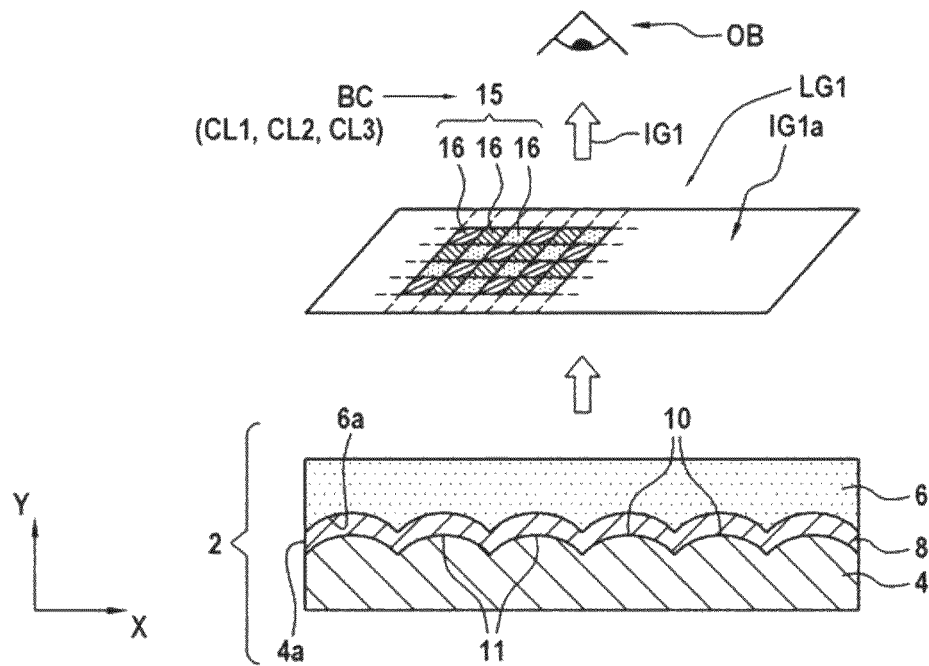

[Fig. 3]
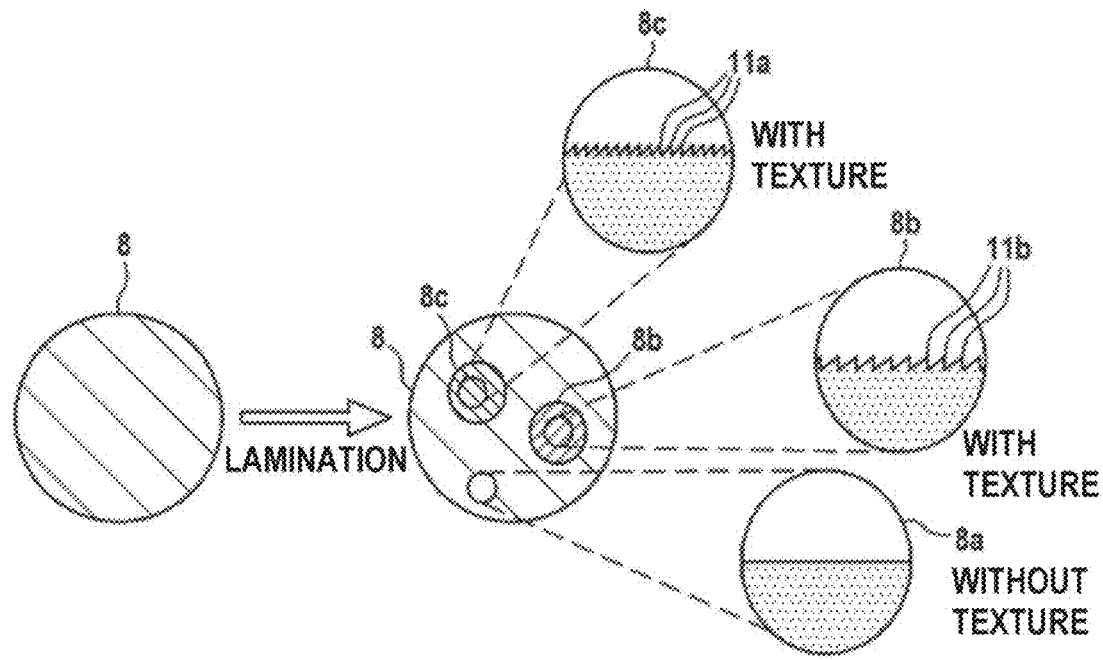
[Fig. 4]
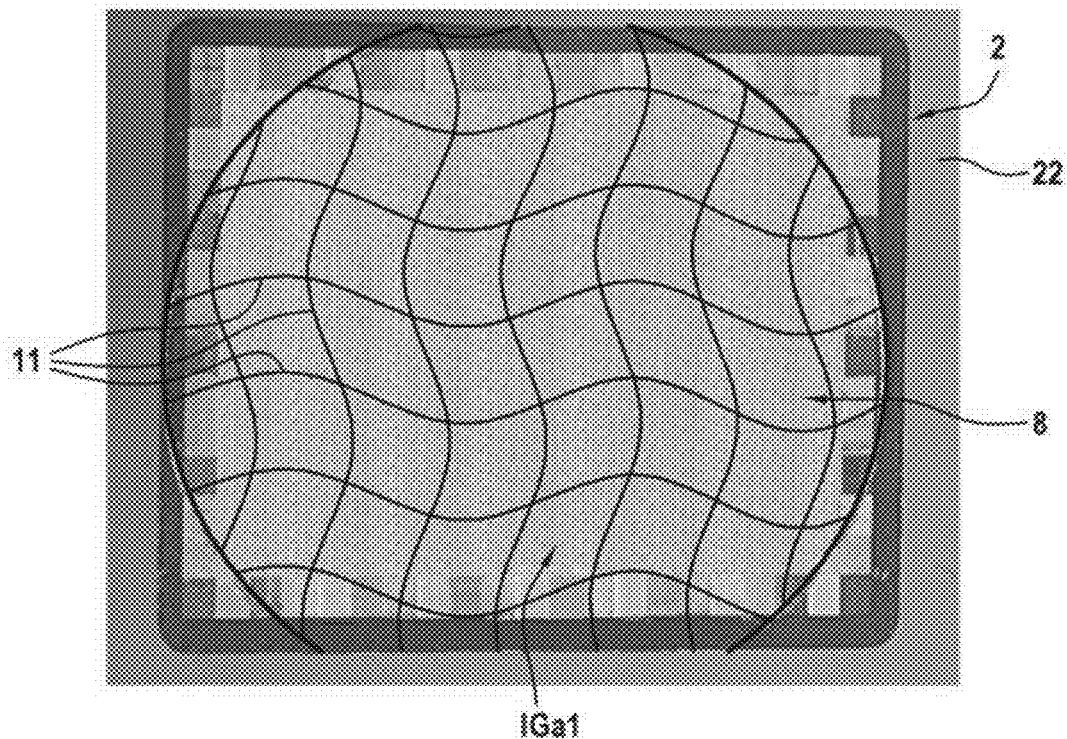

[Fig. 5A-5B]
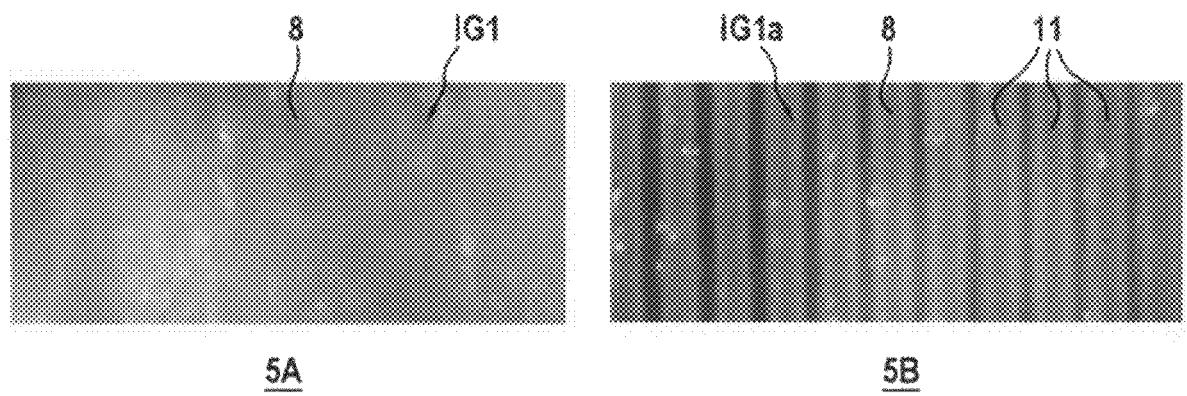
5A
5B
[Fig. 6]
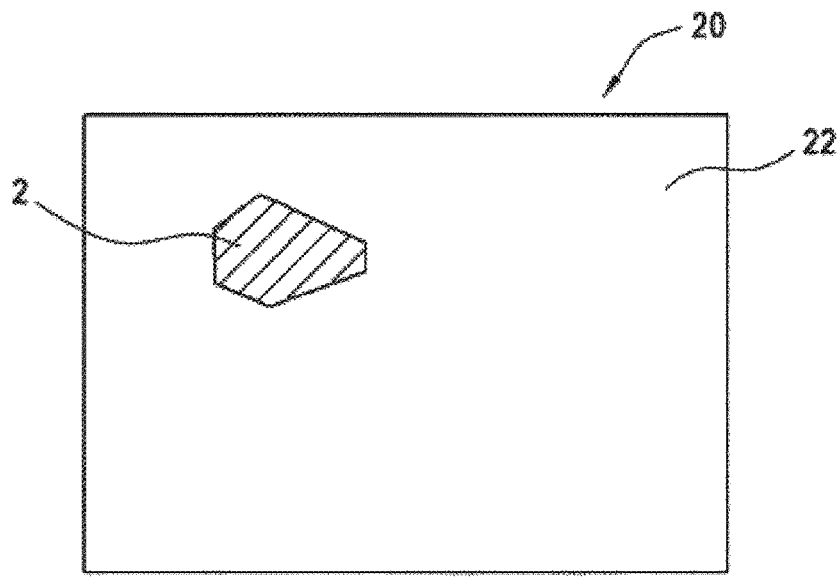

[Fig. 7A-7C]
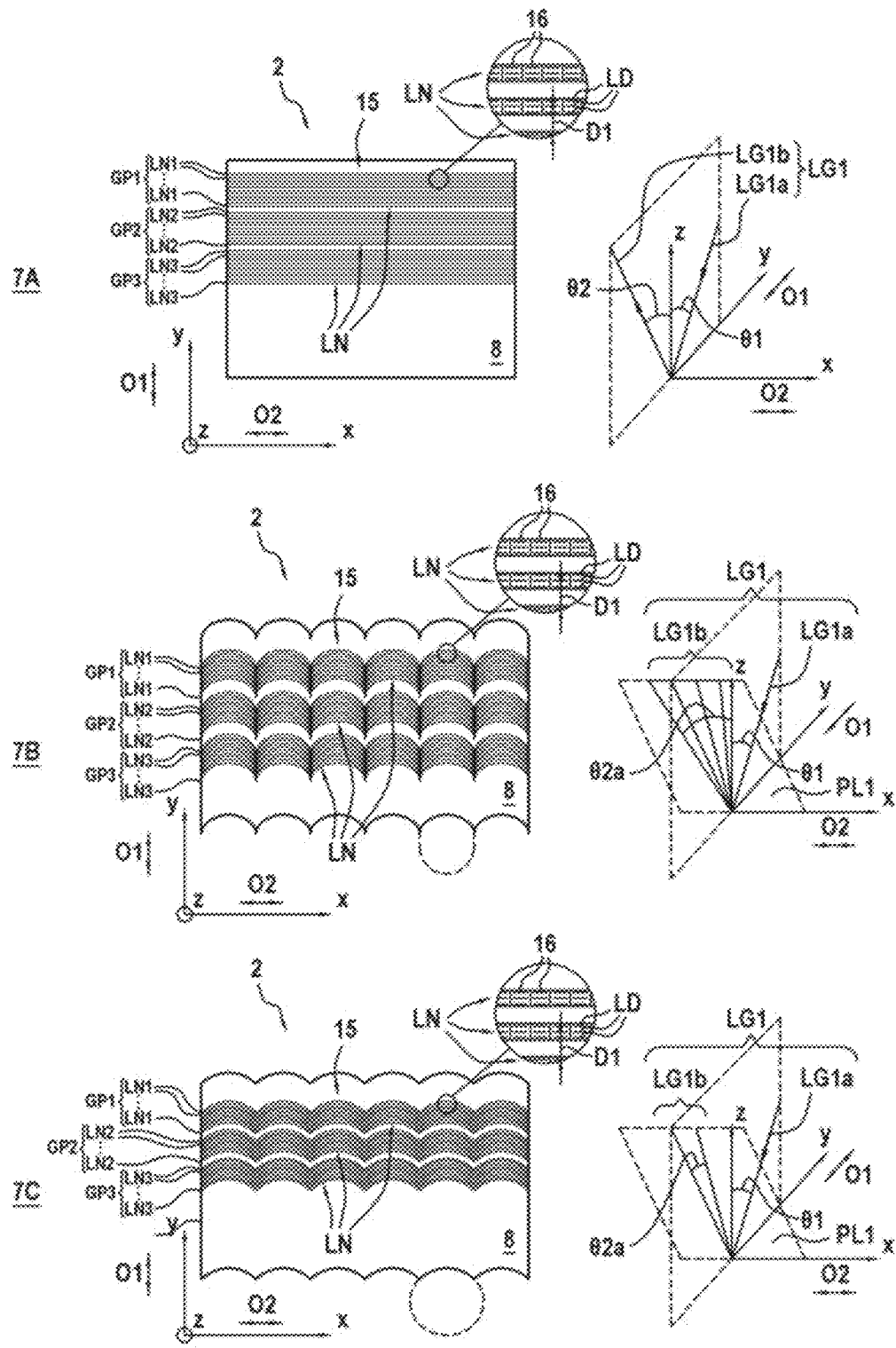

[Fig. 8]
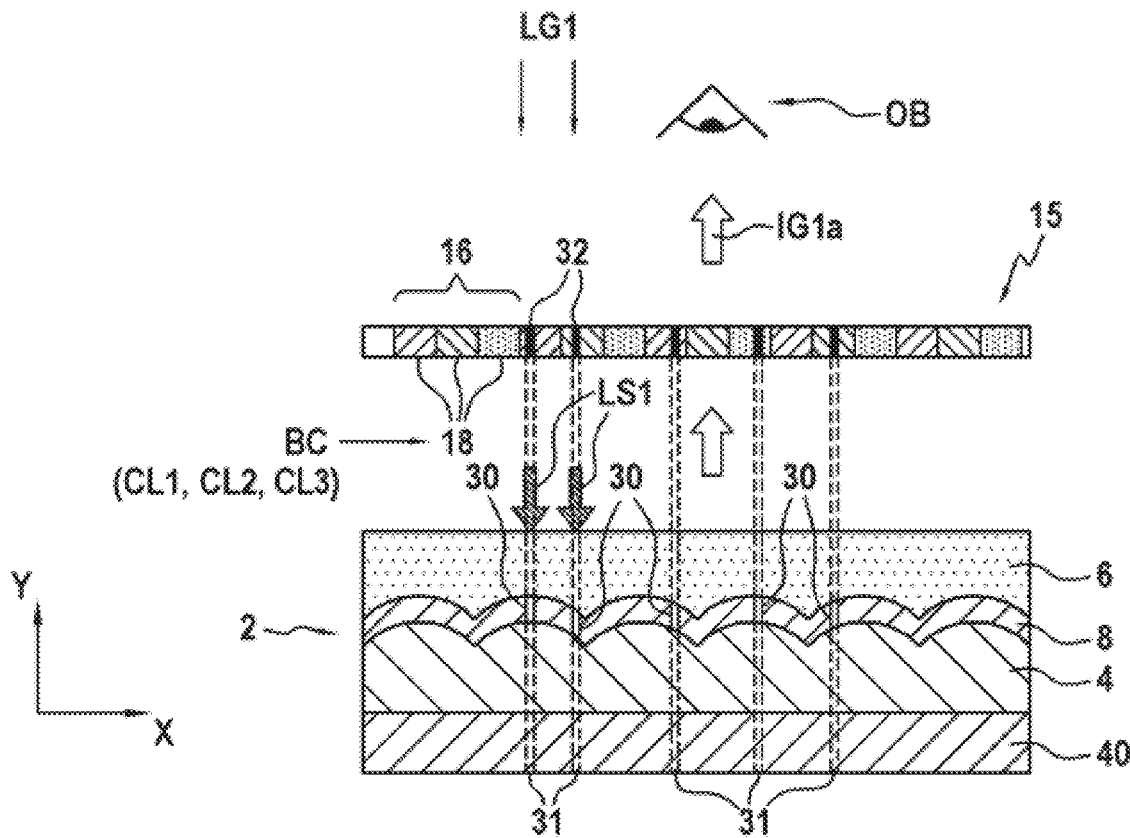
[Fig. 9]
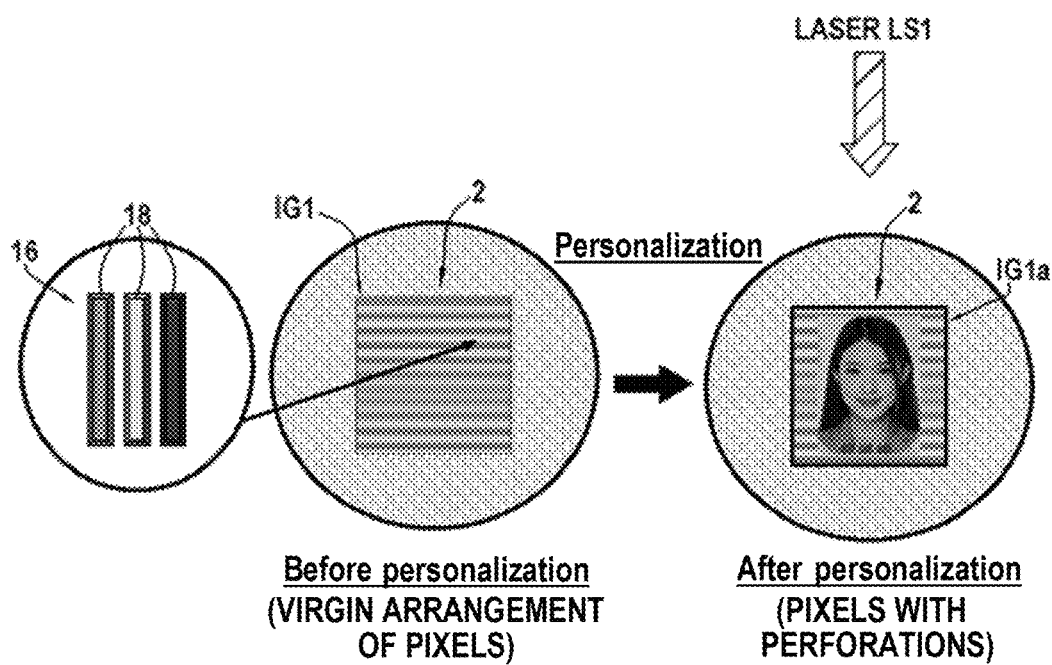

[Fig. 10]
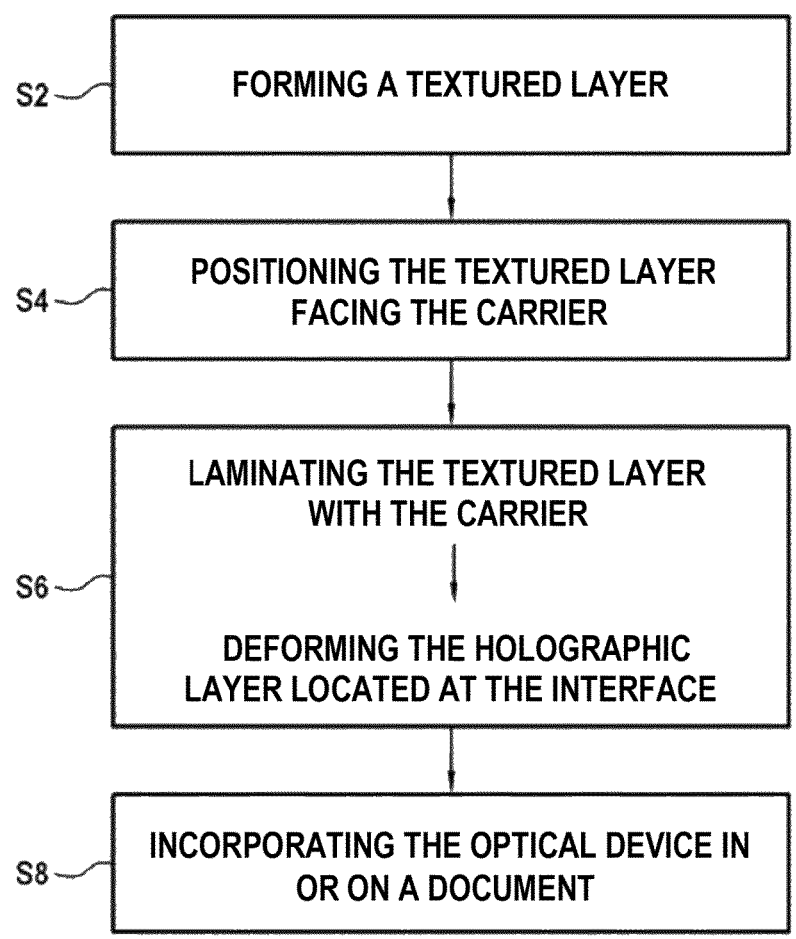

[Fig. 11]
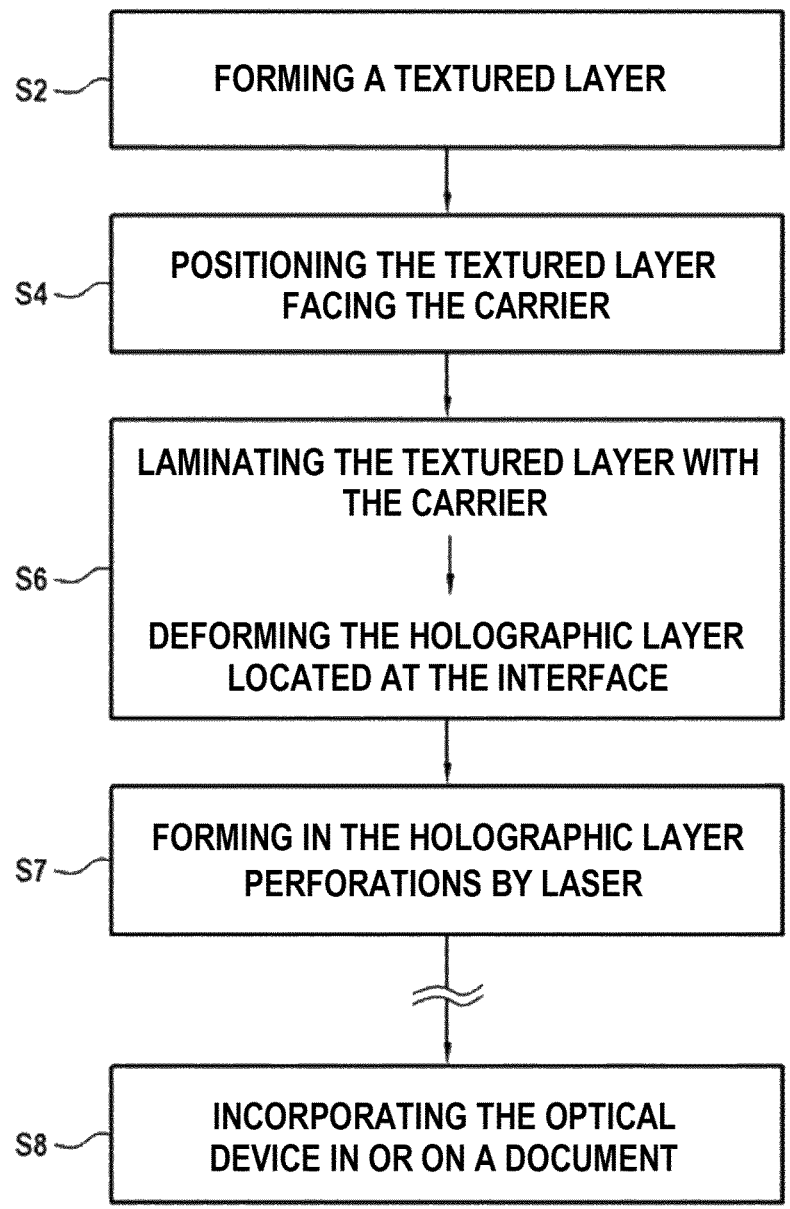

[Fig. 12]
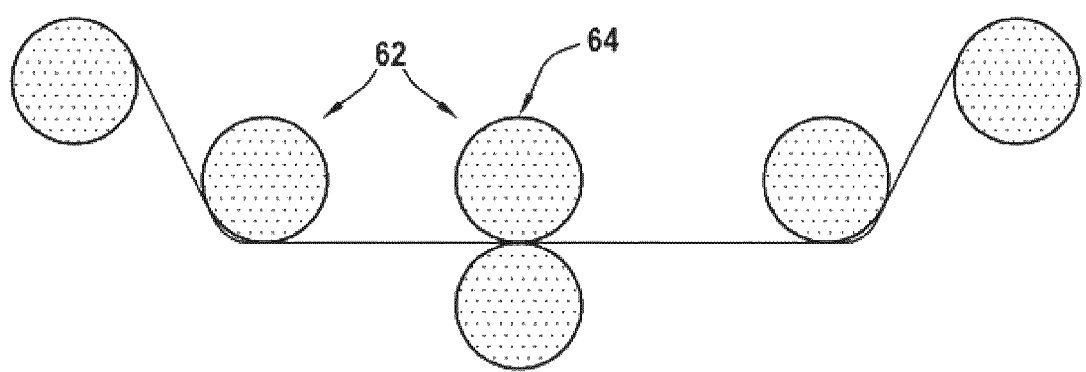

OPTICAL DEVICE WITH HOLOGRAPHIC LAYER

TECHNICAL FIELD

The invention relates to the field of holographic images and especially pertains to optical devices configured to form a holographic image based on an arrangement of pixels. The invention especially targets such optical devices able to be incorporated into a document or any other carrier to serve as security device.

PRIOR ART

The identity market today requires identity documents (also called identification documents) to be increasingly secure. These documents must be easily authenticatable and difficult to counterfeit (if possible unforgeable). This market relates to very diverse documents, such as identity cards, passports, access badges, driving licences, etc., which may take various formats (cards, booklets, etc.).

Various types of secure documents comprising images have thus been developed over time, especially with a view to securely identifying people. More and more passports, identity cards or other official documents today comprise security elements that allow the document to be authenticated and the risks of fraud, falsification or counterfeiting to be limited. Electronic identity documents comprising a chip card, such as electronic passports for example, have thus seen a substantial increase in popularity over the last few years.

Various printing techniques have been developed over the course of time to produce prints of images, in black and white or in colour. Production in particular of identity documents such as the aforementioned requires images to be produced securely in order to limit the risks of falsification by ill-intentioned individuals. The manufacture of such documents, in particular as regards the image used to identify the bearer, need to be complex enough to make reproduction or falsification by an unauthorized individual difficult.

Another known image-forming technique concerns holograms, this type of image being able in particular to be used to secure a document or the like. By inspecting for example a holographic image under a certain illumination, it is possible to verify the authenticity of the image and thus determine whether the object with which it is associated is authentic or not.

Optical devices known at the present time, and more particularly those configured to form holographic images, are not however always satisfactory. There is a need to securely form personalized images of high quality (in colour or in black and white), especially so that they may be used as security devices in documents (identification documents, official documents, etc.) or any other object needing to be protected. There is in particular a need to allow flexible and secure personalization of colour, or black-and-white (greyscale), images so that the image thus produced is difficult to forge or to reproduce and can be authenticated reliably and securely.

There is in particular a need for an image-forming technique offering a high level of manufacturing flexibility and security and a good level of image quality, in terms especially of brightness of the image and of palette of colours, for example when image zones must have a highly saturated level in a given colour.

Moreover, to well separate the wavelengths, holographic diffraction gratings generally require relatively small incident-light illumination angles. In addition, the viewing angle is generally restricted if the holographic image is to be viewed with good colours. Beyond a certain observation angle, the observer no longer sees the holographic image correctly.

Because of the stereoscopic vision of humans, it is generally difficult for an observer to correctly view a holographic image. In particular, it is difficult to find the correct illumination angle and the correct observation angle, especially because of the fact that each eye of the observer views the image in a slightly different plane. If the hologram is not illuminated and viewed with the correct pair of (illumination, viewing) angles, the observer does not see, or sees badly, the colours of the holographic image.

There is therefore also a need for high-quality holographic images permitting wider ranges of angles of illumination and of angles of observation.

SUMMARY OF THE INVENTION

To this end, the present invention relates to an optical device comprising:
- a textured layer comprising a first surface having first macro-textures; and
- a carrier comprising on its surface a holographic layer intermediate between the textured layer and the carrier, the holographic layer comprising a diffraction grating forming, via a holographic effect, an arrangement of pixels in a basis of at least two distinct colours,
- the first surface of the textured layer being assembled by lamination with the carrier so that the holographic layer, placed between the textured layer and the carrier, is deformed by the first macro-textures so as to comprise second macro-textures conformal with said first macro-textures, the visual appearance of the arrangement of pixels being personalized via the second macro-textures.

According to one general feature, the second macro-textures of the holographic layer are of semi-cylindrical or elliptical shape and extend along a first orientation in the plane of the holographic layer,
- each pixel being formed by a corresponding segment of the diffraction grating, said corresponding segment being structured into diffractive lines extending along a second orientation perpendicular to the first orientation in the plane of the holographic layer.

The optical device of the invention allows a secure personalized holographic image of high quality to be formed, based on a holographic layer that is configured to form an arrangement of pixels and that is further deformed by lamination with a textured layer so as to personalize the visual appearance of the arrangement of pixels.

The diffraction grating of the holographic layer may lie intrinsically (before lamination) in a single plane (for example in the form of a thin 2D layer). Formation of the second macro-textures confers on the diffraction grating a modified orientation in a (non-planar) third dimension. By virtue of this macro-texture, it is therefore possible to distribute the orientation of the diffraction about the axis perpendicular to the diffraction grating, and thus to create various patterns in the arrangement of pixels, to obtain a personalized holographic image.

The optical device of the invention is difficult to reproduce or falsify and may be authenticated reliably and securely. The optical device may be authenticated by analysing the pattern of the second macro-textures formed in the holographic layer and by verifying the position or alignment of this pattern with respect to the arrangement of pixels.

Thus, one particular application of the invention is especially in security devices able to be associated with a document or any other object with a view to protecting it (for example identification documents, official documents, or the like). The invention in particular allows low-cost personalized security devices allowing a document or the like to be effectively secured to be formed.

Formation of the second macro-textures by lamination in the holographic layer also makes it possible to make the range of observation angles in which an observer is able to view the personalized holographic image produced by the optical device substantial, as described in more detail below in particular examples.

According to one particular embodiment, the first and second macro-textures have a height comprised between 1 µm and 100 µm.

According to one particular embodiment, the pixels of the diffraction grating are at least partially arranged so as to form rows of pixels each in a single colour among the basis of at least two distinct colours, the rows of pixels extending along the second orientation.

According to one particular embodiment, the rows of pixels are arranged periodically in the holographic layer.

According to one particular embodiment, the rows of pixels are arranged in groups of rows of pixels in each colour among the basis of at least two distinct colours, each group comprising a plurality of rows of pixels in a given colour among said basis of at least two distinct colours, the rows of pixels being arranged periodically in each group.

According to one particular embodiment, the rows of pixels are arranged spatially in each said group according to a pitch separating each pair of adjacent rows of pixels, such that P≤100 µm.

According to one particular embodiment, the textured layer has a glass transition temperature higher than or equal to that of the carrier.

According to one particular embodiment, the textured layer and the carrier are formed from the same material or from the same set of materials.

According to one particular embodiment, the holographic layer is characterized by diffractive optical properties that are dependent on the second macro-textures formed by lamination in a pattern in relief imposed by the first macro-textures of the textured layer.

According to one particular embodiment, the pixels in said arrangement of pixels each comprise a plurality of sub-pixels of distinct colours in the basis of at least two distinct colours,
the device comprising a personalization layer positioned facing the holographic layer,
wherein the holographic layer comprises perforations formed by a laser radiation, said perforations revealing locally through the holographic layer zones of colorimetric nuance in the sub-pixels that are caused by subjacent regions, of the personalization layer, that are located facing the perforations, so as to form a personalized holographic image based on the arrangement of pixels combined with the zones of colorimetric nuance.

According to one particular embodiment, the personalization layer is one among:
the textured layer; and
a layer positioned facing the holographic layer so that the textured layer is intermediate between the holographic layer and the personalization layer.

According to one particular embodiment, said personalization layer is opaque with respect to at least the spectrum of wavelengths of the visible, the zones of colorimetric nuance caused by the subjacent regions of the personalization layer being dark zones in the sub-pixels.

According to one particular embodiment, each pixel of said arrangement of pixels forms an identical pattern of sub-pixels of colour in the basis of at least two colours.

According to one particular embodiment, the personalization layer comprises an ink sensitive to ultraviolet, so that the personalized holographic image is visible when the device is exposed to ultraviolet.

According to one particular embodiment, the personalization layer is transparent with respect to at least the spectrum of wavelengths of the visible, the zones of colorimetric nuance caused by the subjacent regions of the personalization layer being light zones in the sub-pixels when incident light in the visible spectrum is projected through the perforations.

Correlatively, the present invention relates to a secure document comprising a document body and an optical device such as defined above and described below in particular embodiments. The optical device may thus be incorporated by way of security device in or on the document body.

The present invention also targets a corresponding manufacturing process, namely a process for manufacturing an optical device such as defined above and described below in particular embodiments. In particular, the invention provides a process for manufacturing an optical device, said process comprising:
forming a textured layer comprising a first surface having first macro-textures; and
positioning the first surface of the textured layer facing a carrier comprising on its surface a holographic layer intermediate between the textured layer and the carrier, the holographic layer comprising a diffraction grating forming, via a holographic effect, an arrangement of pixels in a basis of at least two distinct colours; and
laminating the first surface of the textured layer on the carrier, causing a deformation by the first macro-textures of the holographic layer placed between the textured layer and the carrier, so as to form in the holographic layer second macro-textures conformal with said first macro-textures, the visual appearance of the arrangement of pixels being personalized via the second macro-textures.

According to one general feature, the second macro-textures of the holographic layer are of semi-cylindrical or elliptical shape and extend along a first orientation in the plane of the holographic layer, each pixel being formed by a corresponding segment of the diffraction grating, said corresponding segment being structured into diffractive lines extending along a second orientation perpendicular to the first orientation in the plane of the holographic layer.

It will be noted that the various embodiments mentioned above (and those described below) in relation with the optical device of the invention and the associated advantages apply analogously to the manufacturing process of the invention.

According to one particular embodiment, during the formation of the textured layer, the first macro-textures of the textured layer are formed by laser or using a thermocompression moulding technique.

The invention also relates to a process for manufacturing a secure document such as defined above.

BRIEF DESCRIPTION OF THE DRAWINGS

Other features and advantages of the present invention will become apparent from the description given below, with reference to the appended drawings, which illustrate examples of embodiment of the invention that are completely non-limiting in nature. In the figures:

FIG. 1 schematically shows the constituent elements of an optical device in the process of manufacture according to at least one embodiment of the invention;

FIG. 2 schematically shows the structure of an optical device according to at least one embodiment of the invention;

FIG. 3 schematically shows the structure of the holographic layer of an optical device according to at least one embodiment of the invention;

FIG. 4 shows an optical device according to at least one embodiment of the invention;

FIGS. 5A and 5B are top views showing a region of the holographic layer of an optical device before and after lamination, respectively, according to embodiments of the invention;

FIG. 6 shows a secure document comprising an optical device according to at least one embodiment of the invention;

FIG. 7A schematically shows the holographic layer of an optical device before lamination according to one embodiment of the invention, and FIGS. 7B and 7C schematically show the holographic layer of an optical device after lamination according to embodiments of the invention;

FIG. 8 shows an optical device of the invention according to at least one embodiment of the invention;

FIG. 9 shows an optical device of the invention according to at least one embodiment of the invention;

FIG. 10 shows, in the form of a chart, the steps of a manufacturing process according to certain embodiments of the invention;

FIG. 11 shows, in the form of a chart, the steps of a manufacturing process according to certain embodiments of the invention; and FIG. 12 schematically shows formation of a textured layer during a process of manufacture according to at least one embodiment of the invention.

DESCRIPTION OF EMBODIMENTS

As already indicated, the invention relates to an optical device configured to form securely a holographic image of high quality, potentially able to be authenticated by an observer or a third-party entity. To do this, the invention implements a texture-transfer technique to transfer by lamination macro-textures from a textured layer to a holographic layer, the latter comprising a (or at least one) diffraction grating configured to form, via a holographic effect, an arrangement of pixels in a basis of colours. This texture transfer is carried out by deforming the holographic layer by lamination with the textured layer so that the holographic layer forms or adopts on its surface macro-textures that modify its diffractive optical properties, this leading to a personalization of the arrangement of pixels, and therefore of the visual effect (or visual appearance) produced by the holographic layer.

The invention, according to its various embodiments, thus implements an optical device comprising: a textured layer comprising a first surface having first macro-textures; and a carrier comprising on its surface a holographic layer intermediate between the textured layer and the carrier, the holographic layer comprising a (or at least one) diffraction grating forming, via a holographic effect, an arrangement of pixels in a basis of at least two distinct colours. The first surface of the textured layer is assembled by lamination with the carrier so that the holographic layer, placed between the textured layer and the carrier, is deformed by the first macro-textures so as to comprise second macro-textures conformal with said first macro-textures, the visual appearance of the arrangement of pixels being personalized via the second macro-textures.

The invention is equally applicable to formation of colour holographic images and to formation of black-and-white, i.e. greyscale, holographic images. Thus, in the present document, the notion of colour may apply by extension to the greyscale levels of a black-and-white image.

In this document, the notion of "macro-texture" designates reliefs formed on the surface of a material (for example polycarbonate for an identity document) using a suitable forming process allowing the surface of this material to be deformed (for example, by means of a deforming technique employing a $CO_2$ laser, by lamination, etc.), the shape and mechanical-strength properties of the reliefs thus obtained allowing reliefs to be transferred by lamination (quantifiably and adjustably) to another surface. Thus, as described below, transfer of textures (or macro-textures) is possible from a first surface comprising first macro-textures to a second surface, namely that of an optically active layer placed facing the first surface.

As explained below, it is thus possible to obtain a personalized holographic image of high quality, in colour or in black and white, that is secure because it is difficult to falsify or reproduce, and easy to authenticate, and therefore robust against the risks of fraud, falsification or counterfeiting. Various patterns of reliefs of the first macro-textures may be used to adapt the second macro-textures formed in the holographic layer depending especially on the visual effect and on the level of complexity desired.

The invention also relates to a secure document comprising the optical device of the invention, and a process for manufacturing such an optical device. Other aspects and advantages of the present invention will become apparent from the examples of embodiment described below with reference to the drawings mentioned above.

In this document, examples of implementation of the invention are described in the context of an optical device able to serve as security device with respect to a document or any other carrier with which it is associated (or even into which it is incorporated). The invention is not however limited merely to the examples of embodiment described below and may be more generally applied to formation of an optical device configured to produce a secure personalized holographic image of high quality based on a holographic layer deformed by lamination with a textured layer.

Unless otherwise indicated, elements common to a plurality of figures or analogous elements in a plurality of figures have been designated with the same reference signs and have identical or analogous characteristics, and hence these common elements have generally not been described more than once for the sake of simplicity.

The terms "first", "second", etc. have been used in this document by arbitrary convention to allow various elements (such as layers, macro-textures, etc.) implemented in the embodiments described below to be identified and distinguished.

FIGS. 1 and 2 schematically show the structure of an optical device 2 according to one particular embodiment of the invention. As illustrated in FIGS. 1-2, the optical device 2 comprises a textured layer 4, a carrier 6 and a holographic layer 8.

As described in detail below, the optical device 2 is manufactured based on a lamination of the textured layer 4 with the carrier 6 so that the holographic layer 8 is intermediate between the textured layer 4 and the carrier 6. FIG. 1 shows the intrinsic constituent elements of the optical device 2 before the lamination step and the intrinsic holographic image IG1 intrinsically formed by the holographic layer 8 before lamination. FIG. 2 shows the optical device 2 formed following lamination, and a personalized holographic image (or final image) IG1a produced by the optical device 2 following the deformation by lamination of the holographic layer 6.

More particularly, the textured layer 4 comprises a first surface 4a, namely the top face in this example, this first surface 4a having first macro-textures denoted 10. These first macro-textures 10 are reliefs, present on the surface of the textured layer 4, and the shapes and dimensions of which may be adapted according to the circumstances. As described below, these first macro-textures 10 are intended to deform by lamination the holographic layer 8 in order to create in the latter second macro-textures 11 that constitute a texture conformal or complementary to the first macro-textures 10. The first macro-textures 10 of the textured layer 4 may form a particular pattern (relief pattern) intended to be transferred to the holographic layer 8 as described below.

As indicated below, the first macro-textures 10 for example have a height comprised between 1 µm and 100 µm. The configuration in number, size, shape, etc. of the first macro-textures 10 may be adapted by a person skilled in the art depending on the sought visual effect.

The first macro-textures 10 are uniform or regular, here semi-cylindrical or semi-spherical reliefs, able to be arranged periodically, as described below.

According to one particular example, the first macro-textures 10 are irregular or random macro-textures. To this end, the surface 4a of the textured layer 4 is for example an unmachined surface or a surface that has not undergone any particular treatment in order to guarantee it an irregular or rough surface finish.

The first macro-textures 10 may be formed in various ways, for example by laser (by means of a $CO_2$ laser or the like) or by a thermo-compression moulding technique (as described below with reference to FIG. 12). It is thus possible to form the first macro-textures 10 by laser thermal reflow or by laser ablation (ablation by means of ultra-short laser pulses).

The holographic layer 8, placed between the textured layer 4 and the carrier 6, comprises a diffraction grating forming, via a holographic effect, an arrangement 15 of pixels 16 in a colour basis BC of at least two distinct colours (FIGS. 1-2). It will be noted that this diffraction grating may itself be formed by a plurality of diffraction gratings. This arrangement 15 of pixels 16 intrinsically forms, before lamination of the textured layer 4 with the carrier 6, the intrinsic holographic image IG1 (FIG. 1). The lamination leads to personalization of the arrangement 15 of pixels 16 which then forms the personalized holographic image IG1a (FIG. 2).

The colour basis BC is considered, by way of example, to be composed of 3 distinct colours CL1, CL2 and CL3 (for example a red-green-blue basis), other examples of colour bases BC with a plurality of distinct colours being possible.

More precisely, the holographic layer 8 for example comprises a metal holographic structure configured to form, via a holographic effect, an arrangement 15 of colour pixels 16 in the basis of colours BC. This holographic structure intrinsically produces the arrangement 15 of pixels 16 in the form of a holographic image IG1 by diffraction, refraction and/or reflection of incident light LG1. The configuration in size, shape, dimensions, etc. of the arrangement 15 may be adapted case by case by a person skilled in the art. In particular, the shapes and dimensions of the pixels 16 and the spatial arrangement of the pixels 16 may vary according to the circumstances.

The principle of holograms is well known to those skilled in the art. Certain elements will be recalled below for the sake of reference. Examples of embodiment of holographic structures are for example described in document EP 2 567 270 B1. In particular, the diffraction that occurs in a hologram is an effect of reflection with interference, as well known to those skilled in the art. By definition, diffraction in a holographic diffraction grating is therefore a particular case of the phenomenon of reflection at the interface between two materials. In other words, the optically active layer 8 may be considered to be holographic if it is both reflective and diffractive.

In this example, the optical layer 8 is considered to be characterized by optical properties (in particular diffractive properties) that define the way in which incident light LG1 interacts with the holographic layer 8, especially by diffracting to produce a visual effect, as described below.

According to one particular example, the holographic layer 8 for example comprises reliefs (or structures in relief) and a high-refractive-index metal underlayer that covers these reliefs and that has a refractive index higher than the refractive index of the reliefs. These reliefs comprise protruding segments (also called "peaks") separated by recesses (also called "valleys"), so as to define three-dimensional holographic-image information. The high-refractive-index metal underlayer may comprise at least one among the following materials: aluminium, silver, copper, zinc sulfide, titanium oxide, or a combination of at least two of these materials. These reliefs, made up of peaks and valleys, form, in combination with the metal underlayer, a holographic structure that produces a hologram or holographic effect.

The reliefs of the diffraction grating of the holographic layer 8 may be formed for example by embossing a layer of stamping varnish in a known way to produce diffractive structures. The stamped surface of the reliefs thus takes the form of a periodic diffraction grating the depth of which and the period of which may respectively be of the order of one hundred to a few hundred nanometres for example.

Moreover, the carrier 6 may be any carrier. It may be a question of a carrier layer for example allowing the mechanical strength of the assembly to be ensured.

As shown in FIG. 1, the diffraction grating of the holographic layer 8 is intrinsically configured (before the lamination of the constituent elements of the optical device 2) to form an arrangement 15 of pixels 16.

As shown in FIG. 2, the first surface 4a of the textured layer 4 is assembled by lamination with the carrier 6 so that the holographic layer 8, placed between the textured layer 4 and the carrier 6, is deformed by the first macro-textures 10 to have (or comprise, or adopt) second macro-textures 11 conformal (or complementary) to the first macro-textures 10. Thus, the second macro-textures 11 of the holographic layer 8 are formed in correspondence with the first macro-textures 10 of the textured layer 4.

By lamination, what is meant in this document is a mechanical process consisting in fastening together at least two layers by applying to these layers mechanical pressure for a suitable time, with heating or not, so that the layers employed are assembled at pressures and temperatures such that the materials from which they are made reach their Vicat softening point and interpenetrate locally to yield substantially coherent laminated assemblies.

Thus, lamination of the first surface 4a of the textured layer 4 with the carrier 6 implies a pressing action (or pressure), and optionally heating (hot lamination), this causing a transfer of texture (or transfer of relief) from the textured layer 4 to the holographic layer 8 positioned facing. During lamination, the holographic layer 8 deforms via a transfer of the macro-textures 10 from the textured layer 4 to the holographic layer 8. Under the effect of this deformation, the second macro-textures 11 are generated in the holographic layer 8 conformally with the first macro-textures 10. Thus, the second macro-textures 11 according to which the holographic layer 8 is deformed during the lamination are complementary, or substantially complementary (if allowance is made for any imperfections in the transfer process), to the first macro-textures 10 of the textured layer 4. In other words, the pattern according to which are formed the second macro-textures 11 is complementary to the pattern of the first macro-textures 10. The patterns of the first and second macro-textures 10, 11 respectively define the spatial arrangement of these macro-textures.

The deformation by lamination of the diffraction grating of the holographic layer 8 leads to a personalization (or modification) of the visual appearance of the holographic layer 8, i.e. of the arrangement 15 of pixels 16 intrinsically forming the intrinsic holographic image IG1, so as to obtain a personalized visual appearance of the arrangement 15 of pixels 16 that then takes the form of a personalized holographic image IG1a that is dependent on the second macro-textures 11 formed in the holographic layer 8. In other words, the holographic image IG1a thus obtained is formed by the holographic layer 8 deformed by lamination to adopt the second macro-textures 11.

In this example, the holographic layer 8 is laminated directly against the textured layer 4, although variants are possible in which one or more intermediate layers are present at the interface between the holographic layer 8 and the textured layer 4.

According to one particular example, the holographic layer 8 is substantially flat before lamination (it lies in a plane). Generally, it is assumed that the holographic layer 8 follows the orientation of the carrier 6 before lamination in so far as the holographic layer 8 is placed above. The holographic layer 8 may for example be formed (deposited, printed, etc.) on the carrier 6 before carrying out the lamination with the textured layer 4. The texturization of the carrier 6 is thus constrained by the adhesion of the holographic layer 8 to the carrier 6 depending on the forming process (printing process for example) used.

According to one particular example, the carrier 6 comprises a surface (or face) 6a on which is formed the holographic layer 8 before lamination with the textured layer 4, this surface 6a possibly being smooth or having a slight random roughness in order to facilitate formation of the holographic layer 8 (manipulation of the carrier and, where appropriate, adhesion of the ink). The holographic layer 8 is for example deposited on the carrier 6 and adhesively bonded thereto via a hot pressing process. The surface 6a of the carrier 6 for example has a roughness on average lower than 5 μm in amplitude before lamination with the textured layer 4a.

FIG. 3 schematically shows the way in which the diffraction grating of the holographic layer 8 may be modified by the process of lamination of the textured layer 4 with the carrier 6. It is for example assumed that the holographic layer 8 intrinsically comprises (before lamination) a uniform diffractive structure without particular pattern. Under the effect of the lamination, the holographic layer 8 is deformed so that its diffraction grating adopts at least one particular pattern, namely that of the second macro-textures 11a or 11b, for example in the zones 8c and 8b respectively.

The optical device 2 may be configured so that the holographic layer 8 comprises a plurality of textured regions, for example the textured regions 8b and 8c (FIG. 3), these regions comprising different second macro-textures 11. The optical device 2 may also be configured so that the holographic layer 8 comprises at least one non-textured region 8a (FIG. 3), i.e. a region devoid of second macro-textures 11.

According to one particular example, the first and second macro-textures 10, 11 have a height comprised between 1 μm and 100 μm.

The pattern of the second macro-textures 11 formed during the deformation by lamination in the holographic layer 8 may be of various natures, and comprises semi-cylindrical or elliptical reliefs.

Other examples of embodiment are however possible. The pattern of the second macro-textures 11 may also comprise any combination of the above pattern configurations.

According to the example considered here, the textured layer 4 has a glass transition temperature higher than or equal to that of the carrier 6. As is well known, the glass transition temperature is the temperature at which the material in question becomes viscous. In other words, the textured layer 4 is harder than the carrier 6, this making it possible to guarantee a good adhesion of the structure in its entirety during the lamination. Generally, it is preferable for the textured layer 4 to be hard enough to resist where appropriate hot transfer (if heat is applied) and to allow textures to be transferred and the structure in its entirety to be given a good mechanical strength.

According to one particular example, the textured layer 4 and the carrier 6 are formed from the same material or from the same set of materials. Thus, the textured layer 4 and the carrier 6 have the same ability to adhere and may therefore fuse and adhere well to each other during the lamination, this making it possible to guarantee that the structure will have good mechanical properties. It is thus more difficult to subsequently separate the constituent elements of the optical device 2, this making the latter more robust to falsifications.

The textured layer 4 and the carrier 6 may for example both be formed from a material, or set of materials, based on polymer. They may for example be made of plastic (polycarbonate, polyethylene, etc.).

According to one particular example, during the lamination, the textured layer 4 may fuse with the carrier 6 in one or more regions where the holographic layer 8 is not present at the interface between the textured layer 4 and the carrier 6. To this end, apertures may be produced in the holographic layer 8 or, more generally, at least one region of contact is provided so that the textured layer 4 is in direct contact with the carrier 6 (i.e. so that there is no optically active layer 8 at the interface in this region). The effect of fusion of the textured layer 4 with the carrier 6 then leads to the creation of bridges of adhesion fastening the textured layer 4 to the carrier 6 so as to trap the holographic layer 8 within the structure, this allowing the good mechanical properties of the assembly to be still further improved.

More particularly, the deformations generated by the lamination may cause modifications of the (diffractive or reflective) optical properties of the holographic layer 8. Thus, after lamination, the holographic layer 8 is characterized by reflective or diffractive optical properties that are dependent on the second macro-textures 11 caused by the first macro-textures 10. These modifications of the optical properties in turn engender personalized visual effects IG1a that are difficult to reproduce, and that are authenticatable using any suitable optical inspection technique. The complexity of the visual effects IG1a may be controlled by adapting the pattern of the first macro-textures 10, and therefore the pattern of the second macro-textures 11 that are arranged spatially conformally with (or complementarily to) the first macro-textures 10. The visual effects IG1 produced by the optical device 10 may especially be uniform or non-uniform, or respect a particular pattern imposed by the spatial arrangement of the second macro-textures 11.

According to one particular example, formation of the second macro-textures 11 in the optically active layer 8 leads to a change in the diffractive optical properties of the active optical layer 8 after lamination with respect to the intrinsic optically active layer 8 (before lamination). This change may result in a change in intensity of incident light LG1 diffracted by the optically active layer 8 as a function of an angle of incidence of the incident light LG1 with respect to said holographic layer 8, or even in a change in colour (or hue) as a function of the angle of incidence of the incident light LG1.

According to one particular example, the carrier 6 is composed of a material (or of a set of materials) that is (are) at least partially transparent to light in the spectrum of wavelengths of the visible, this allowing the holographic layer 8 to be exposed to (or illuminated with) the incident light LG1 from the top side of the optical device 2 and the personalized visual effect IG1a produced in response by the holographic layer 8 to be observed (seen from above as illustrated in FIG. 2). In this particular case, the textured layer 4 may be opaque or transparent according to the circumstances. In the case where the textured layer 4 is also at least partially transparent to light in the spectrum of wavelengths of the visible, an observer may then view the personalized visual effect IG1a produced by the holographic layer 8 from both (top and bottom) sides of the optical device 2.

According to variants of embodiment, the textured layer 4 is composed of a material (or of a set of materials) that is (are) at least partially transparent to light in the spectrum of wavelengths of the visible, this allowing the holographic layer 8 to be exposed to the incident light from the bottom side of the optical device 2 and the personalized visual effect IG1a produced in response by the holographic layer 8 to be observed (seen from below). In this particular case, the carrier 6 may be opaque or transparent according to the circumstances. As indicated above, when the carrier 6 and the textured layer 4 are transparent, it is possible to illuminate and to view the holographic layer 8 from both sides of the optical device 2.

The ability to illuminate and view the holographic layer 8, and therefore the visual rendering of the optical device 2 under incident light, are then dependent on the degree of transparency of the carrier 6 and/or of the textured layer 4.

The personalized visual rendering IG1a thus obtained then forms a holographic image when the optical device 2 is exposed to incident light (in the spectrum of wavelengths of the visible for example). Optical inspection may be carried out by an observer 08 (with the naked eye or by means of a viewing apparatus) or by means of an optical inspecting apparatus configured to inspect (automatically or not) the personalized visual effect IG1a produced by the optical device 2 under illumination by incident light.

FIG. 4 shows one example of a personalized holographic image IG1a produced by an optical device 2 under illumination by incident light, for example in the spectrum of wavelengths of the visible, as described above. More precisely, this personalized image IG1a emanates from the holographic layer 8, which is configured to form the arrangement 15 of pixels 16, and which has second macro-textures 11 to personalize this arrangement 15. In this example, the second macro-textures 11 thus form, in the final image IG1a, a pattern of predetermined geometric shape (a grid of curvilinear lines in this example).

The diffraction grating may lie intrinsically (before lamination) in a single plane (for example to form a thin 2-dimensional layer). Formation of the second macro-textures 11 then confers a particular 3-dimensional (non-planar) orientation on the diffraction grating. In other words, the effect of the lamination is that the diffraction grating no longer lies in a single plane but has orientations in three dimensions (for example with protruding portions, valleys, recesses, etc.). Thus, by virtue of the second macro-textures 11, it is possible to distribute the orientation of the diffraction in a personalized way, for example about the axis perpendicular to the axis of the diffraction grating.

The lamination carried out allows however the intrinsic structure of the diffraction grating to be completely or substantially preserved. Specifically, the spatial orientation of the holographic layer 8 (which contains the diffraction grating) is modified or personalized whereas the intrinsic structure of the diffraction grating is preserved. Thus, the diffraction grating may in particular preserve the same period, but with a different orientation in space.

FIGS. 5A and 5B are views from above of a region of the holographic layer 8 before lamination (FIG. 5A) and after lamination (FIG. 5B) of the textured layer 4 with the carrier, as described above, respectively. As illustrated in FIG. 5B, second macro-textures 11 of semi-spherical or elliptical shape are formed in the holographic layer 8, this causing introduction of a stripy pattern into the final holographic image IG1a.

According to one particular embodiment, the optical device 2 such as described above (FIGS. 1-4) is able to be incorporated (or positioned) in or on a document with a view to serving as security device. Such a document comprising the optical device 2 thus forms a secure document in so far as the optical device 2 may be authenticated based on a visual or optical analysis of the personalized holographic image IG1a produced by the holographic layer 8 under illumination by incident light.

FIG. 6 schematically shows a secure document 20 comprising a document body 22 in which is incorporated the optical device 2 serving as security device according to one particular embodiment. In this example, the secure document 20 is for example a card (chip card, badge, or the like). The shape and configuration of the optical device 2 and of the document 20 itself may be adapted by a person skilled in the art depending on the use case.

The optical device of the invention allows a secure personalized holographic image of high quality to be formed, based on a holographic layer that is configured to form an arrangement of pixels and that is further deformed by lamination with a textured layer so as to personalize the visual appearance of the arrangement of pixels.

In a standard fashion, the diffraction grating of the holographic layer may lie intrinsically (before lamination) in a single plane (for example in the form of a thin 2D layer). Addition of the macro-texture according to the invention then confers on the diffraction grating an orientation in a (non-planar) third dimension. By virtue of this macro-texture, it is therefore possible to distribute the orientation of the diffraction about the axis perpendicular to the diffraction grating, and thus to create various patterns in the arrangement of pixels, to obtain a personalized holographic image.

The optical device of the invention is difficult to reproduce or falsify and may be authenticated reliably and securely. The optical device may be authenticated by analysing the pattern of the macro-textures formed in the holographic layer and by verifying the position or alignment of this pattern with respect to the arrangement of pixels.

Thus, one particular application of the invention is especially in security devices able to be associated with a document or any other object with a view to protecting it (for example identification documents, official documents, or the like). The invention in particular allows low-cost personalized security devices allowing a document or the like to be effectively secured to be formed.

In the examples described above, the holographic layer 8 is incorporated, within the structure of the optical device 2, between the textured layer 4 and the carrier 6, which are laminated together and preferably fused together, this making it difficult for a forger to access the holographic layer 8 without damaging or destroying the optical device 2.

Formation of the second macro-textures 11 by lamination in the optical layer 8 also makes it possible to make the range of observation angles in which an observer OB is able to view the personalized holographic image IG1a produced by the optical device 2 substantial, as described in more detail below in particular examples.

Particular embodiments of the optical device 2 are now described with reference to FIGS. 7A-7C, 8 and 9. FIG. 7A shows the holographic layer 8 before the lamination of the textured layer 4 with the carrier 6, whereas FIGS. 7B and 7C show the holographic layer 8 in which second macro-textures 11 according to embodiments of the invention have been formed by lamination.

More precisely, in these particular examples the considered second macro-textures 11 formed by lamination in the holographic layer 8 are of semi-cylindrical shape (FIG. 7B) or elliptical shape (FIG. 7C) and extend along a first orientation (or in a first direction) denoted O1 in the (xy)-plane of the holographic layer 8. The semi-cylindrical or elliptical second macro-textures 11 allow the incident light LG1 diffracted by the diffraction gratings to be oriented uniformly in space, thus improving the quality of the holographic image viewable by an observer based on the colour pixels 16.

As already indicated, the holographic layer 8 is further configured to form in hologram form an arrangement 15 of pixels 16. In these examples, the pixels 16 are each formed by a corresponding segment (or section) of the diffraction grating of the holographic layer 8. These corresponding segments of the diffraction grating, and more generally the diffraction grating itself, are structured into (comprise) diffractive lines LD extending along a second orientation (or in a second direction) O2 perpendicular to the first orientation O1 in the plane of the holographic layer. By diffractive lines what is meant here is diffraction lines into which is structured the diffraction grating of the holographic layer 8. In the examples considered here, the diffractive lines LD are rectilinear, although variants are possible with curvilinear diffraction lines.

As already indicated, the way in which the pixels 16 are arranged may vary according to the circumstances. According to particular embodiments, the pixels 16 of the diffraction grating of the holographic layer 8 are at least partially arranged so as to form rows of pixels denoted LN, each of these rows being in a single colour CL1-CL3 among the basis of colours BC. As illustrated in FIGS. 7A-7C, these rows LN of pixels are parallel and oriented along the orientation O2. Thus, these rows LN of pixels extend perpendicularly (or substantially perpendicularly) to the orientation O1 of the second macro-textures 11 of semi-cylindrical or elliptical shape (FIGS. 7B-7C). In other words, the rows LN of pixels and the sections of the diffraction grating (i.e. the diffractive lines LD) from which these rows LN of pixels are formed are perpendicular to the semi-cylindrical or elliptical second macro-textures 11.

As illustrated in FIG. 7A, the holographic layer 8 before lamination is devoid of macro-texture. Under illumination by incident light LG1, the holographic layer 8 therefore forms, via a holographic effect, rows LN of pixels of colour that are not personalized by means of macro-textures. In this example, the rows LN of non-personalized pixels thus extend in 2 dimensions, namely in (or substantially in) the plane of the holographic layer 8. An incident ray LG1a is thus diffracted by the diffraction grating of the holographic layer 8 so as to form a diffracted ray LG1b. The range of angles of illumination 81, with respect to the normal to the plane of the holographic layer 8, in which the holographic layer 8 must be illuminated by the incident light LG1 to form a holographic image is by nature small. Furthermore, the range of angles of observation 82, with respect to the normal to the plane of the holographic layer 8, in which the holographic image is viewable by an observer is also by nature small.

As illustrated in FIGS. 7B-7C, formation by lamination of the second macro-textures 11 in the holographic layer 8 allows the range of angles of illumination 81, with respect to the normal to the plane of the holographic layer 8, in which the holographic layer 8 must be illuminated by the incident light LG1 to form a holographic image, namely the personalized image IG1a, to be increased. Likewise, this allows the range of angles of observation 82, with respect to the normal to the plane of the holographic layer 8, in which the personalized holographic image IG1a is viewable to be increased.

In addition, the perpendicular configuration of the rows LN of pixels (and therefore of the diffractive lines LD) with respect to the second macro-textures 11 allows a good holographic-image quality to be obtained in so far as this allows uniform diffraction of the incident light LG1 by the rows LN of pixels to be guaranteed and makes it possible to prevent the diffraction effect from being suppressed or limited under certain conditions. Specifically, the deformations generated by the texture may thus be the same (or substantially the same) in each row LN of pixels. If, in contrast, the second macro-textures 11 were parallel to the rows LN of pixels, certain lines of colour could always be on a peak of the second macro-textures 11 and others always in a recess. The orientation of the diffraction would then be different from one row LN of pixels to another, and this would degrade the quality of the final holographic image.

According to one particular embodiment, the rows LN of pixels are arranged periodically in the plane of the holographic layer 8. This arrangement allows a uniform visual effect to be obtained by diffraction of incident light by the diffraction grating of the holographic layer 8.

According to one particular embodiment, the rows LN of pixels are arranged in groups GP of rows LN of pixels in each colour among the basis of colours BC, each group GP comprising a (or being formed of a) plurality of rows LN of pixels in a given colour among the colours CL1-CL3 of the basis of colours BC. The rows LN of pixels are further arranged periodically in each group GP. It is thus possible to arrange spatially the groups GP to achieve a periodic alternation of the various colours of the basis BC of colours used. This particular arrangement allows a good image quality to be obtained.

According to one particular embodiment, the rows of pixels are arranged spatially in each group GP according to a pitch D1 separating each pair of adjacent rows LN of pixels, such that P≤100 μm (FIGS. 7A-7C). In other words, the rows LN of pixels are arranged spatially in each group GP so that each pair of two adjacent rows LN of pixels are spaced apart from each other by a pitch P, where P≤100 μm. The distance D1 separating the neighbouring rows LN of pixels is thus smaller than the separating ability of the human eye, this allowing a good holographic-image quality to be obtained in so far as an observer is incapable of distinguishing or differentiating the rows LN of pixels from one another individually.

According to particular embodiments, the pixels 16 of the arrangement 15 formed by the holographic layer 8 each comprise a plurality of sub-pixels of distinct colours (or respective colours) in the basis BC of colours (CL1-CL3 in this example).

FIGS. 8-9 thus show one particular embodiment in which the pixels 16 of the arrangement 15 each comprise a plurality of sub-pixels 18 of distinct colour in the basis BC of at least two distinct colours (namely CL1-CL3 in this example). To this end, each sub-pixel 18 is formed by a respective segment (or section) of the diffraction grating of the holographic layer 8, which segment (or section) is configured to generate by diffraction a corresponding colour of said sub-pixel.

The configuration of the pixels and sub-pixels in number, shapes, arrangement, etc. may vary according to the circumstances. According to one particular example, each pixel 16 of the arrangement 15 of pixels forms an identical pattern of sub-pixels of colour in the basis BC of colours (for example a red-green-blue pattern in a predetermined spatial arrangement). This arrangement 15 of pixels 16 is furthermore personalized by means of perforations as described below.

Again in the example illustrated in FIGS. 8-9, the optical device 2 further comprises a personalization layer 40 positioned facing the holographic layer 8. In the example considered here, the personalization layer 40 is an additional layer positioned under the textured layer 4, so that the textured layer 4 is intermediate between the holographic layer 8 and the personalization layer 40. Variants of arrangement are however possible. According to one variant, the personalization layer and the textured layer 4 may for example form one and the same layer, so that no other additional layer is required to this end.

As illustrated in FIG. 8, the holographic layer 8 comprises perforations (or micro-perforations) 30 formed by laser radiation LS1. These perforations 30 reveal locally through the holographic layer 8 zones of colorimetric nuance 32, in the sub-pixels 18, caused by subjacent regions 31 of the personalization layer 40. These subjacent regions 31, which are located facing the perforations 30, personalize the arrangement 15 of pixels and allow thus the personalized holographic image (or final image) IG1*a* to be formed based on the arrangement 15 of pixels combined with the zones of colorimetric nuance 32.

The perforations 30 form regions in which the holographic layer 8 is destroyed (or removed) locally via the effect of perforation of the laser. In addition to destroying locally the diffractive structure of the holographic layer 8, these perforations 30 reveal locally through the holographic structure zones of colorimetric nuance 32 that are caused by the subjacent regions 31 positioned in correspondence in the personalization layer 40. To do this, in this example the textured layer 4 and the carrier 6 considered are transparent 4 with respect at least to the spectrum of wavelengths of the visible so that a user may view, in the shape of the zones of colorimetric nuance 32, the subjacent regions 31 of the personalization layer 40.

The perforations 30 are through-perforations that extend right through the thickness of the holographic layer 8 so as to reveal the subjacent regions 31 of the personalization layer 34 in the arrangement 15 of pixels 16. In other words, by producing these perforations 30 by laser in the thickness of the holographic layer 8, it is possible to uncover subjacent regions 31 of the personalization layer 40 so as to produce the zones of colorimetric nuance 32 in all or some of the sub-pixels 18.

The zones of colorimetric nuance 32 are zones of nuance in respect of colour (or of greyscale level) relative to the respective colours of the sub-pixels 18. The nature and aspect of these zones of colorimetric nuance 32 may vary depending on the configuration of the personalization layer 40 used. As described below, the personalization layer 40 may be opaque, or transparent, or even be sensitive to ultraviolet, this impacting differently the colorimetric influence of the zones of colorimetric nuance 32 in the final image IG1*b*.

Thus, in the example shown in FIGS. 8-9, the personalization layer 40 considered is opaque with respect to at least the spectrum of wavelengths of the visible. Thus, the zones of colorimetric nuance 32 caused by the subjacent regions 31 of the personalization layer 40 are dark (or opaque) zones formed in the sub-pixels 18. Under illumination by incident light LG1 in the spectrum of wavelengths of the visible, a personalized holographic image IG1*a* is thus formed by the arrangement 15 of pixels combined with the dark zones 32.

According to one particular example, the personalization layer 40 comprises an ink sensitive to ultraviolet, so that the personalized holographic image IG1*a* is visible when the optical device 2 (and more particularly the holographic layer 8) is exposed to ultraviolet. Under illumination by incident light LG1 in the ultraviolet, the ink produces light in the spectrum of wavelengths of the visible, thus causing colorimetric nuances 32 to form in the sub-pixels 18.

In one particular example, the personalization layer 40 is transparent with respect to at least the spectrum of wavelengths of the visible. Thus, the zones of colorimetric nuance 32 caused by the subjacent regions 31 of the personalization layer 40 are light (or bright) zones in the sub-pixels 18 when incident light LG1 in the spectrum of wavelengths of the visible is projected through the perforations 32.

To do this, the perforations 30 may have various shapes and dimensions that may vary according to the circumstances. More particularly, the perforations 30 are arranged so as to select the colour of the pixels 16 by modifying the colorimetric contribution of the sub-pixels 18 with respect to one another in some at least of the pixels 16 formed by the holographic layer 8, so as to reveal the personalized image IG1*a* based on the arrangement 15 of pixels combined with the zones of colorimetric nuance 32.

By locally destroying by perforation all or some sub-pixels 18 and by revealing, instead, subjacent portions 31 of the personalization layer 40, hues (or greyscale levels) are thus generated in the pixels 16 by modifying the colorimetric contribution of certain sub-pixels 18, with respect to one another, in the visual rendering of the final image IG1*a*. The zones of colorimetric nuance 32 in particular allow passage of light to be modulated so that, for some at least of the pixels 16, one sub-pixel 18 or more has a colorimetric contribution (or weight) increased or decreased with respect to that of at least one other sub-pixel 18 neighbouring the pixel in question. The holographic effect may thus be eliminated, or decreased, in the perforated regions of the holographic layer 8, this decreasing (or even completely eliminating) the relative colourwise contribution of the sub-pixels 18 that are perforated at least partially with respect to at least one other sub-pixel 18 neighbouring the pixels 16 in question.

Here, the considered personalized image IG1*a* thus created is a colour image resulting from a selective modulation of the colorimetric contributions of colour sub-pixels 18. It will however be noted that it is possible to produce, in the same way, a greyscale personalized image IG1*a* by adapting the colours of the sub-pixels 18 accordingly.

The laser radiation LS1 used to form the perforations 30 in the holographic layer 8 is preferably in a wavelength spectrum different from the spectrum of wavelengths of the visible. For example, a YAG laser (for example at a wavelength of 1064 nm), a blue laser, a UV laser, etc. may be used to this end. Moreover, a pulse frequency comprised between 1 kHz and 100 kHz may for example be applied, although other configurations are envisageable. It is up to a person skilled in the art to choose the configuration of the laser radiation LS1 according to the particular circumstances.

In one particular example, the laser radiation LS1 is characterized by a wavelength spectrum that is absorbed at least partially by the holographic layer 8. To this end, the materials of the holographic layer 8 are therefore chosen accordingly.

According to one particular example, the materials forming the holographic layer 8 are selected so that they do not absorb light in the visible. In this way, it is possible to create perforations 30 by means of laser radiation LS1 emitted outside of the visible spectrum and to generate a personalized image IG1*a* that is visible to the human eye via a holographic effect. To do this, the holographic layer 8 may for example be made of transparent polycarbonate, PVC, transparent adhesive, etc.

According to one particular example, the perforations 30 are formed by projecting laser radiation LS1 onto the holographic layer 8 with a power lower than or equal to a threshold value beyond which a blistering effect (loss of adherence between the layers) is liable to occur, this making it possible to ensure that air bubbles liable to damage the structure are not generated. This threshold laser-power value is however variable and depends on each use case (it especially depends on the types of holograms and on the characteristics of the laser used). This threshold value may be determined by a person skilled in the art, especially via suitably designed experiments allowing the laser power beyond which the laser destroys the structure (causes bubbles to appear) to be determined.

The addition of perforations 30 thus allows hues to be created so as to form a secure colour image IG1*a* of good quality, by virtue of the interaction between the zones of colorimetric nuance 32 and the arrangement 15 of pixels formed by the holographic layer 8. According to one particular example, without formation of these zones of colorimetric nuance 32 by perforation as described above to orient or select judiciously passage of the incident light LG1, the pixels 16 form only a virgin arrangement of pixels in so far as this assembly is devoid of the information characterizing the desired colour image. It is the perforations 30 that are configured, depending on the chosen arrangement of sub-pixels 18, to personalize the visual appearance of the pixels 16 and thus reveal the final colour image IG1*a*.

A process for manufacturing an optical device 2 (FIGS. 1-9) such as presented above is described below with reference to FIGS. 10-12, according to particular embodiments. Generally, the various embodiments and details of implementation described above regarding the optical device 2 with reference to FIGS. 1-9 are applicable analogously to the process for manufacturing said optical device 2.

In a forming step S2 (FIGS. 1 and 10), a textured layer 4 such as described above is formed, this layer in particular comprising a first surface 4*a* having first macro-textures 10. The surface 4*a* of the textured layer 4 may have various surface finishes and types of first macro-textures 10.

The first macro-textures 10 of the textured layer are for example formed by laser or using a thermo-compression moulding technique.

In a positioning step S4 (FIGS. 1 and 10), the first surface 4*a* of the textured layer 4 is positioned facing a carrier 6 comprising, on its surface (on the bottom face 6*a* thereof in this example), a holographic layer 8 intermediate between the textured layer 4 and the carrier 6. The holographic layer 8 is formed for example by printing or deposition on the surface 6*a* of the carrier 6 before the subsequent laminating step S6.

In a laminating step S6 (FIGS. 2 and 10), the first surface 4*a* of the textured layer 4 is laminated on the carrier 6, thus causing a deformation by the first macro-textures 10 of the holographic layer 8 placed between the textured layer 4 and the carrier 6, causing the holographic layer 8 to comprise second macro-textures 11 conformal to the first macro-textures 10, as already described. The second macro-textures 11 thus formed are therefore complementary with the first macro-textures 10 of the textured layer 4.

In an incorporating step S8 (FIGS. 2, 6 and 10), the optical device 2 resulting from steps S2-S6 may optionally be incorporated or integrated in or on a document 20, and more particularly in or on the body 22 of said document, so that the optical device 2 may serve as a security device allowing the document in question (then what has been referred to as a "secure document") to be authenticated based on the personalized holographic image IG1*a* thus formed.

According to one particular embodiment shown in FIG. 11, a forming step S7 is further carried out after the laminating step S6, and before the optional incorporating step S8. More particularly, laser radiation LS1 is projected (S7) onto the optical device 2 as already described in order to form perforations 30 (FIGS. 8-9) in the holographic layer 8 so as to form zones of colorimetric nuance 32 in the sub-pixels 18. These (dark, opaque or transparent) zones of colorimetric nuance 32 are caused by subjacent regions 31, of the personalization layer 40, that are located facing the perforations 30, so as to form a personalized holographic image IG1a based on the arrangement 15 of pixels combined with the zones of colorimetric nuance 32.

Moreover, various manufacturing techniques may be used in the manufacturing process of FIGS. 10 and 11 to form the second macro-textures 11 on the surface of the holographic layer 8. As illustrated in FIG. 12, it is for example possible to use a system of rollers 62 comprising at least one textured roller 64 configured to apply by lamination a textured layer 4 to a free face of the holographic layer 8 so as to form the laminated assembly described above.

Those skilled in the art will understand that the embodiments and variants described above are merely non-limiting examples of implementation of the invention. In particular, those skilled in the art will be able to envision any adaptation or combination of the embodiments and variants described above, in order to meet a particular need according to the claims presented below.

The invention claimed is:

1. An optical device comprising:
a textured layer comprising a first surface having first macro-textures; and
a carrier comprising on its surface a holographic layer intermediate between the textured layer and the carrier, the holographic layer comprising a diffraction grating forming, via a holographic effect, an arrangement of pixels in a basis of at least two distinct colours,
the first surface of the textured layer being assembled by lamination with the carrier so that the holographic layer, placed between the textured layer and the carrier, is deformed by the first macro-textures so as to comprise second macro-textures conformal with said first macro-textures, a visual appearance of the arrangement of pixels being personalized via the second macro-textures, the visual appearance being created by forming different patterned portions of the second macro-textures in the holographic layer,
wherein the second macro-textures of the holographic layer are of semi-cylindrical or elliptical shape and extend along a first orientation in a plane of the holographic layer,
each pixel being formed by a corresponding segment of the diffraction grating, said corresponding segment being structured into diffractive lines extending along a second orientation perpendicular to the first orientation in the plane of the holographic layer.

2. The device according to claim 1, wherein the first and second macro-textures have a height comprised between 1 µm and 100 µm.

3. The device according to claim 1, wherein the pixels of the diffraction grating are at least partially arranged so as to form rows of pixels each in a single colour among the basis of at least two distinct colours, the rows of pixels extending along the second orientation.

4. The device according to claim 3, wherein the rows of pixels are arranged periodically in the holographic layer.

5. The device according to claim 3, wherein the rows of pixels are arranged in groups of rows of pixels in each colour among the basis of at least two distinct colours, each group comprising a plurality of rows of pixels in a given colour among said basis of at least two distinct colours,
the rows of pixels being arranged periodically in each group.

6. The device according to claim 5, wherein the rows of pixels are arranged spatially in each said group according to a pitch separating each pair of adjacent rows of pixels, such that P≤100 µm.

7. The device according to claim 1, wherein the textured layer has a glass transition temperature higher than or equal to that of the carrier.

8. The device according to claim 1, wherein the textured layer and the carrier are formed from a same material or from a same set of materials.

9. The device according to claim 1, wherein the holographic layer is comprised by diffractive optical properties that are dependent on the second macro-textures formed by lamination in a pattern in relief imposed by the first macro-textures of the textured layer.

10. The device according to claim 1, wherein the pixels in said arrangement of pixels each comprise a plurality of sub-pixels of distinct colours in the basis of at least two distinct colours,
the device comprising a personalization layer positioned facing the holographic layer,
wherein the holographic layer comprises perforations formed by a laser radiation, said perforations revealing locally through the holographic layer zones of colorimetric nuance in the sub-pixels that are caused by subjacent regions, of the personalization layer, that are located facing the perforations, so as to form a personalized holographic image based on the arrangement of pixels combined with the zones of colorimetric nuance.

11. The device according to claim 10, wherein the personalization layer is one among:
the textured layer; and
a layer positioned facing the holographic layer so that the textured layer is intermediate between the holographic layer and the personalization layer.

12. The device according to claim 10, wherein said personalization layer is opaque with respect to at least a spectrum of wavelengths of visible light, the zones of colorimetric nuance caused by the subjacent regions of the personalization layer being dark zones in the sub-pixels.

13. A secure document comprising:
a document body; and
the optical device according to claim 1 incorporated by way of a security device in or on the document body.

14. A process for manufacturing an optical device, said process comprising:
forming a textured layer comprising a first surface having first macro-textures; and
positioning the first surface of the textured layer facing a carrier comprising on its surface a holographic layer intermediate between the textured layer and the carrier,
the holographic layer comprising a diffraction grating forming, via a holographic effect, an arrangement of pixels in a basis of at least two distinct colours; and
laminating the first surface of the textured layer on the carrier, causing a deformation by the first macro-textures of the holographic layer placed between the textured layer and the carrier, so as to form in the holographic layer second macro-textures conformal with said first macro-textures, a visual appearance of the arrangement of pixels being personalized via the second macro-textures, the visual appearance being created by forming different patterned portions of the second macro-textures in the holographic layer,
wherein the second macro-textures of the holographic layer are of semi-cylindrical or elliptical shape and extend along a first orientation in a plane of the holographic layer,
each pixel being formed by a corresponding segment of the diffraction grating, said corresponding segment being structured into diffractive lines extending along a second orientation perpendicular to the first orientation in the plane of the holographic layer.

\* \* \* \* \*